United States Patent [19]

Bo

[11] 4,242,986
[45] Jan. 6, 1981

[54] INDEPENDENT CRYOGENIC FLUID VAPORIZATION INSTALLATION

[75] Inventor: Ermanno Bo, Ternay, France

[73] Assignee: B.B.M. S.A., Feyzin, France

[21] Appl. No.: 23,194

[22] PCT Filed: Mar. 13, 1979

[86] PCT No.: PCT/FR78/00010
§ 371 Date: Mar. 13, 1979
§ 102(e) Date: Mar. 13, 1979

[87] PCT Pub. No.: WO79/00056
PCT Pub. Date: Feb. 8, 1979

[30] Foreign Application Priority Data
Jul. 22, 1977 [FR] France .................. 77 23352

[51] Int. Cl.³ .................................................. F22B 1/02
[52] U.S. Cl. ........................................ 122/33; 62/52
[58] Field of Search ................ 62/50, 52, 53; 122/33, 122/4 R; 237/8 R; 126/360 A

[56] References Cited
U.S. PATENT DOCUMENTS

| | | | |
|---|---|---|---|
| 1,698,561 | 1/1929 | Ransom | 122/4 R |
| 2,035,396 | 3/1936 | Mesinger | 62/52 |
| 3,225,552 | 12/1965 | Farkas | 62/51 |
| 3,341,122 | 9/1967 | Whittel, Jr. | 237/8 R |
| 3,738,353 | 6/1973 | Santoreli | 62/52 |

FOREIGN PATENT DOCUMENTS 873142 6/1971 Canada .
977830 12/1964 United Kingdom .

Primary Examiner—Ronald C. Capossela
Attorney, Agent, or Firm—Sandler & Greenblum

[57] ABSTRACT

Independent vaporization installation for transforming cryogenic fluids from the liquid to the gaseous state by heating the fluids while circulating them in a tube bundle immersed within the interior of a container.

In an installation comprising a heat generator, a container, a water heating circuit for the water of the container, an exchanger comprising one or several coils immersed in the container and regulation and control means, the invention resides in the fact that the heating water is constantly recycled by means of diffusion racks 54 and aspiration racks 56. The diffusion racks 54 comprise at least four perforated pipes occupying the upper portion of the container 13. The aspiration racks 56 comprise two perforated pipes sutuated near the base of the container and connected to the pumps 16 which direct water back to the generator. The recycle circuit for the water and for the heating is temperature controlled by an automatic regulator controlling a three way gate valve which directs the water either towards the heater, or back to the container 13, depending on the temperature measured and as a function of the preselected temperature.

18 Claims, 9 Drawing Figures

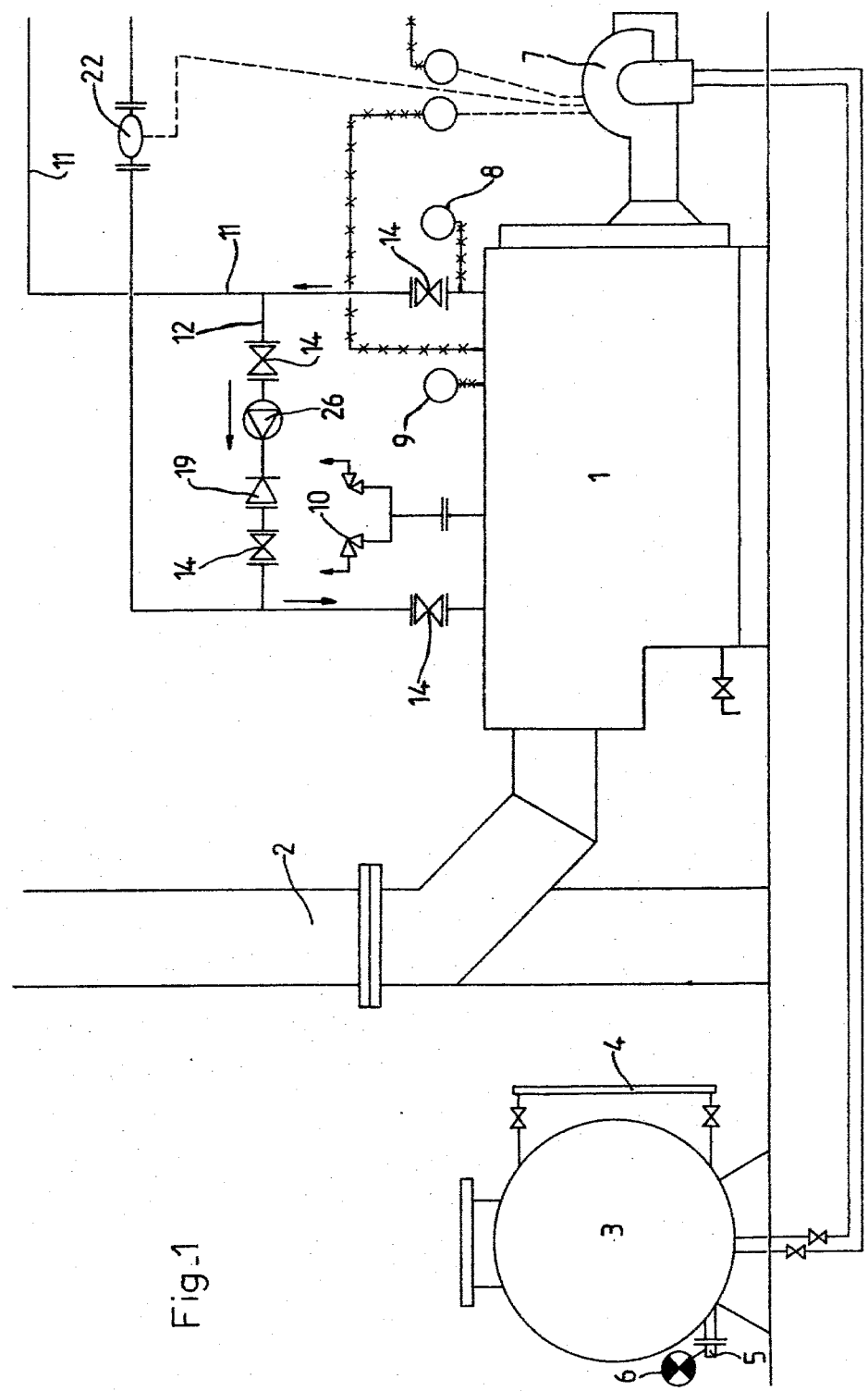
Fig_1

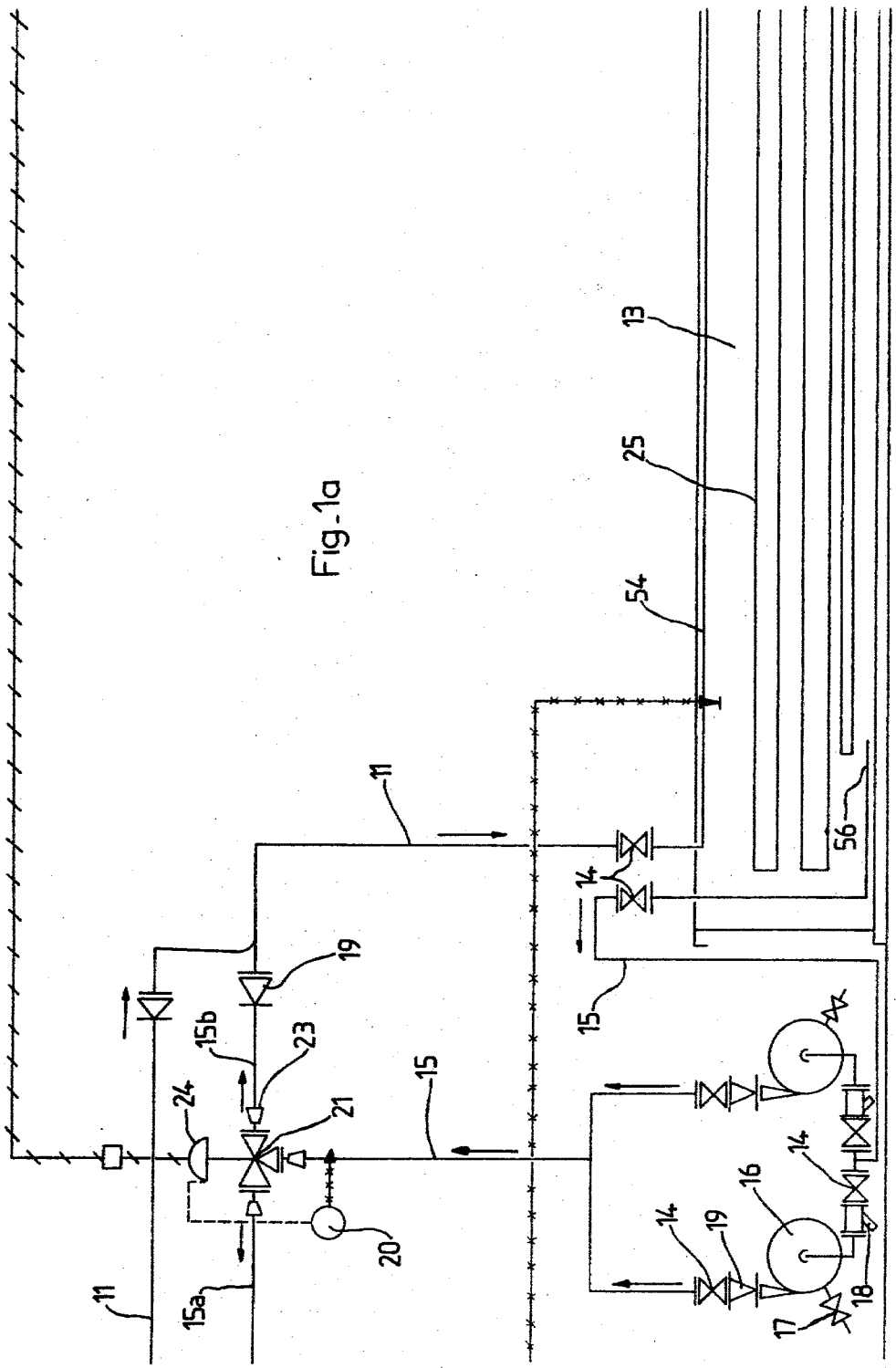

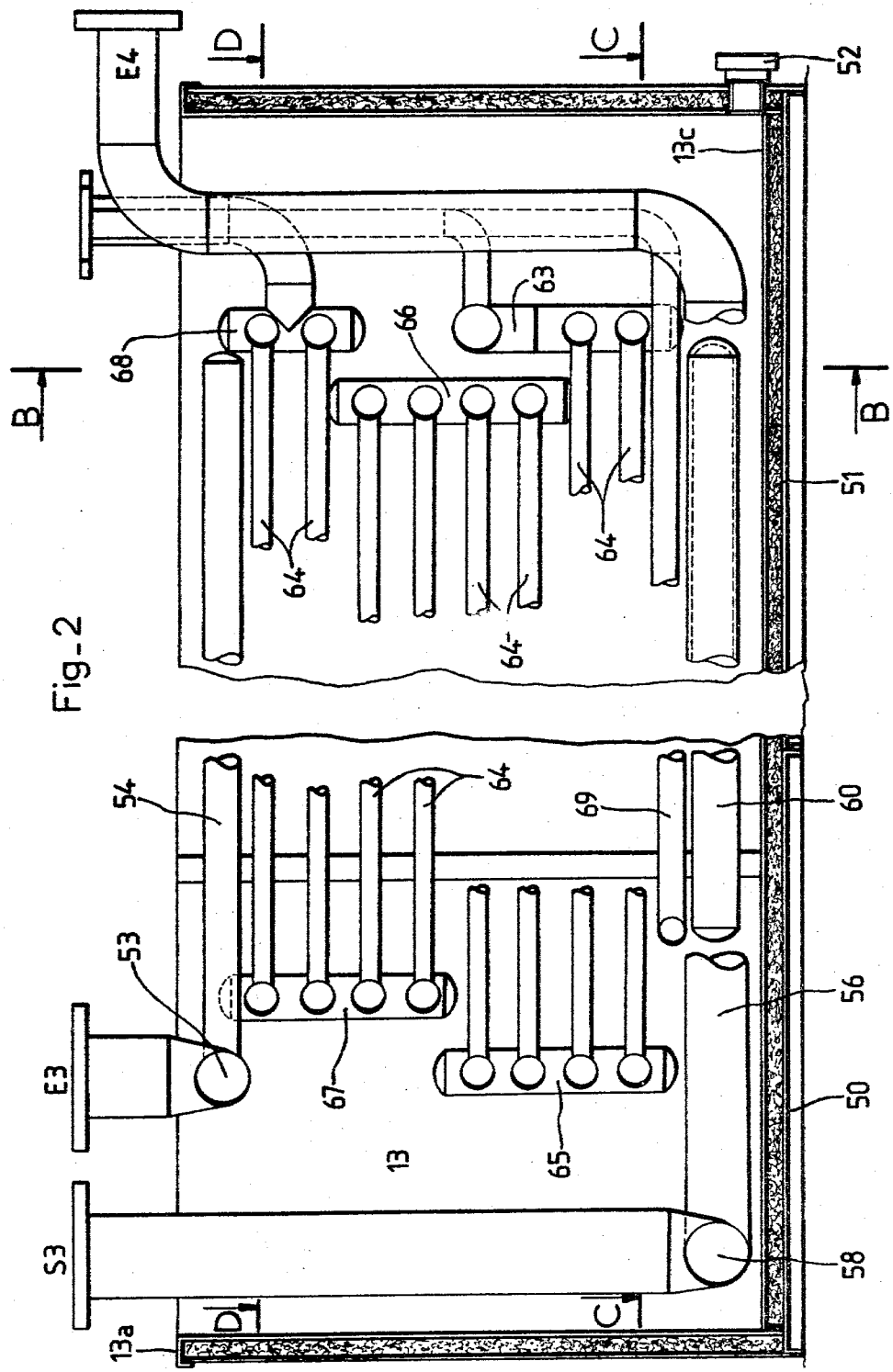

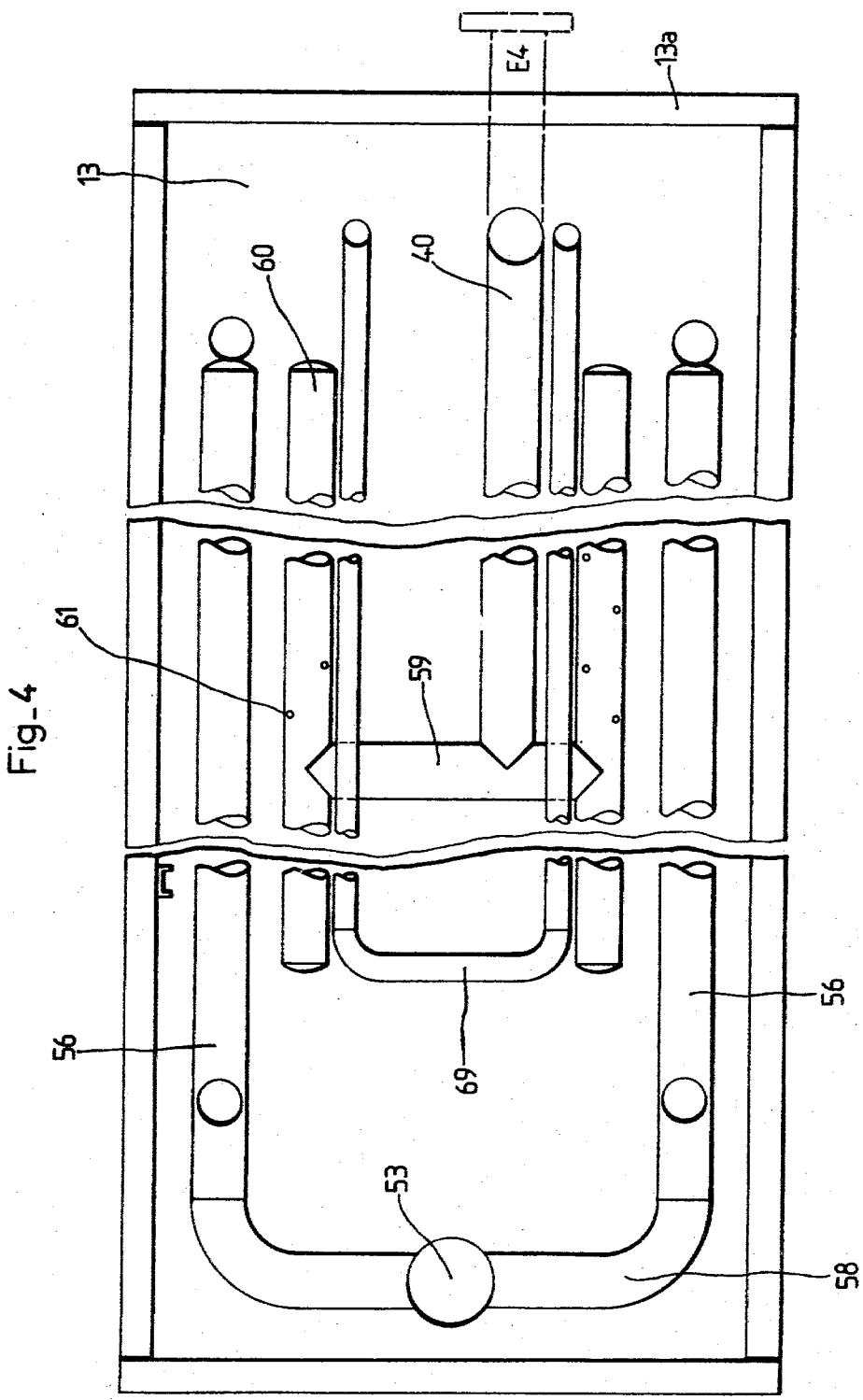

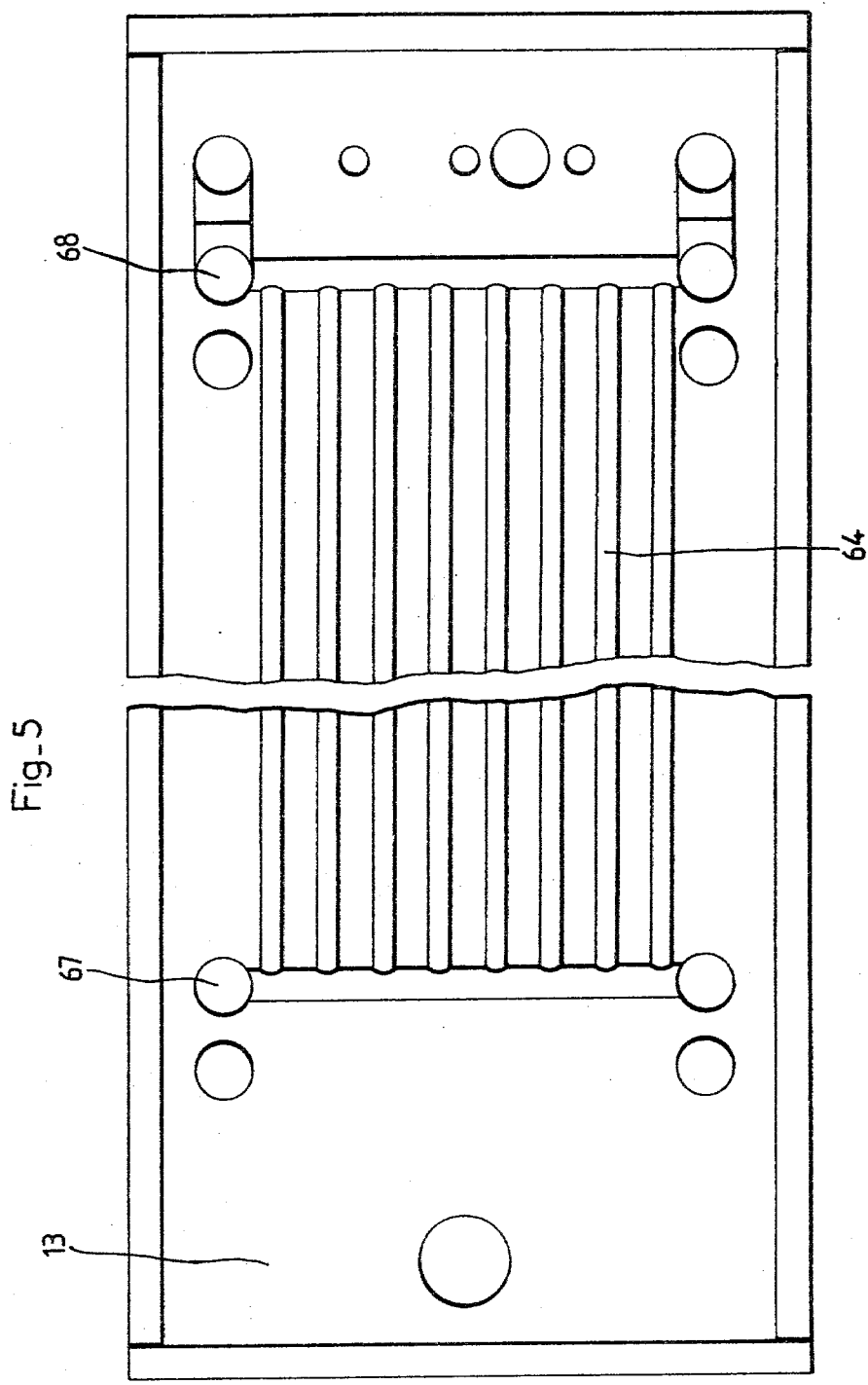

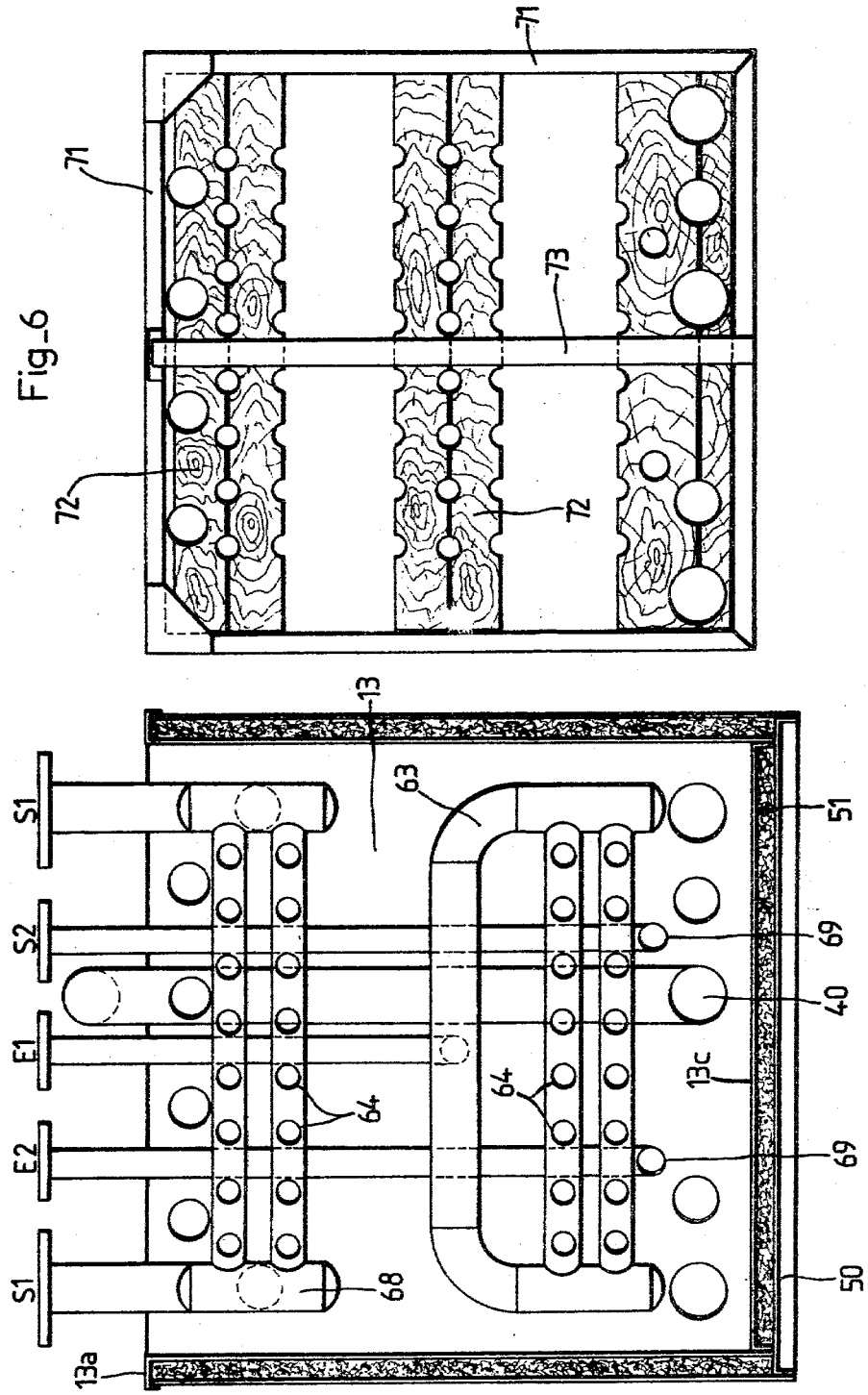

INDEPENDENT CRYOGENIC FLUID VAPORIZATION INSTALLATION

BACKGROUND OF THE INVENTION

The present invention relates to a vaporization installation for transforming cryogenic fluids such as, for example, nitrogen, oxygen, hydrogen, or other fluids, from the liquid to the gaseous state by heating the fluid while it circulates within a tube bundle immersed within a container.

At present, fluids are converted into the gaseous state in atmospheric reheater installations or by lost heating water. Such is the case with the vaporization installation described in U.S. Pat. No. 2,035,396 which comprises a heat generator, a container, a water heater circuit for the water of the container, an exchanger comprising one or several coils immersed in the container, pressure regulation means and safety control means. The heat generator may be a source of hot water, ambient atmosphere or a heated and compressed gas. These elements are attached or installed on a road vehicle as described in British Pat. No. 977,830. These installations are not very economical because they consume a substantial amount of water.

To overcome this inconvenience it is an object of the invention to provide a heating device which operates by circulation of constantly recycled hot water which is economical. The installation for transforming cryogenic fluids is accordingly a closed, self-contained system.

According to the invention the water diffused by the heating racks is constantly recycled by means of other perforated racks which drain the water of the container by virtue of two pumps which return the water to the heater. A reservoir compensates for water lost by virtue of evaporation.

According to another characteristic of the invention, the heating water recycle circuit is controlled with respect to temperature by an automatic regulator controlling a three way gate valve which directs the water either towards the heater or back to the container, depending upon the temperature measured and as a function of the programmed temperature.

According to another characteristic of the invention, the container is insulated to maintain the temperature of the heated water.

According to yet another feature of the invention, the container is provided with anti-vibration means for the tube bundles constituting the heating and recycle circuits.

The invention is illustrated by way of example with reference to the annexed drawings:

FIGS. 1, 1a, and 1b schematically illustrate the various elements comprising the installation and the water and/or steam and gas circuits which it controls;

FIG. 2 is an elevational view showing the container in cross-section with the exchanger immersed;

FIGS. 4 and 5 are planar views respectively illustrating the levels CC and DD of FIG. 2;

FIG. 6 is a front view of one of the support frames of the exchanger; and

FIG. 7 is a side view in cross-section of the container along the line BB of the FIG. 2.

Figure 1B:
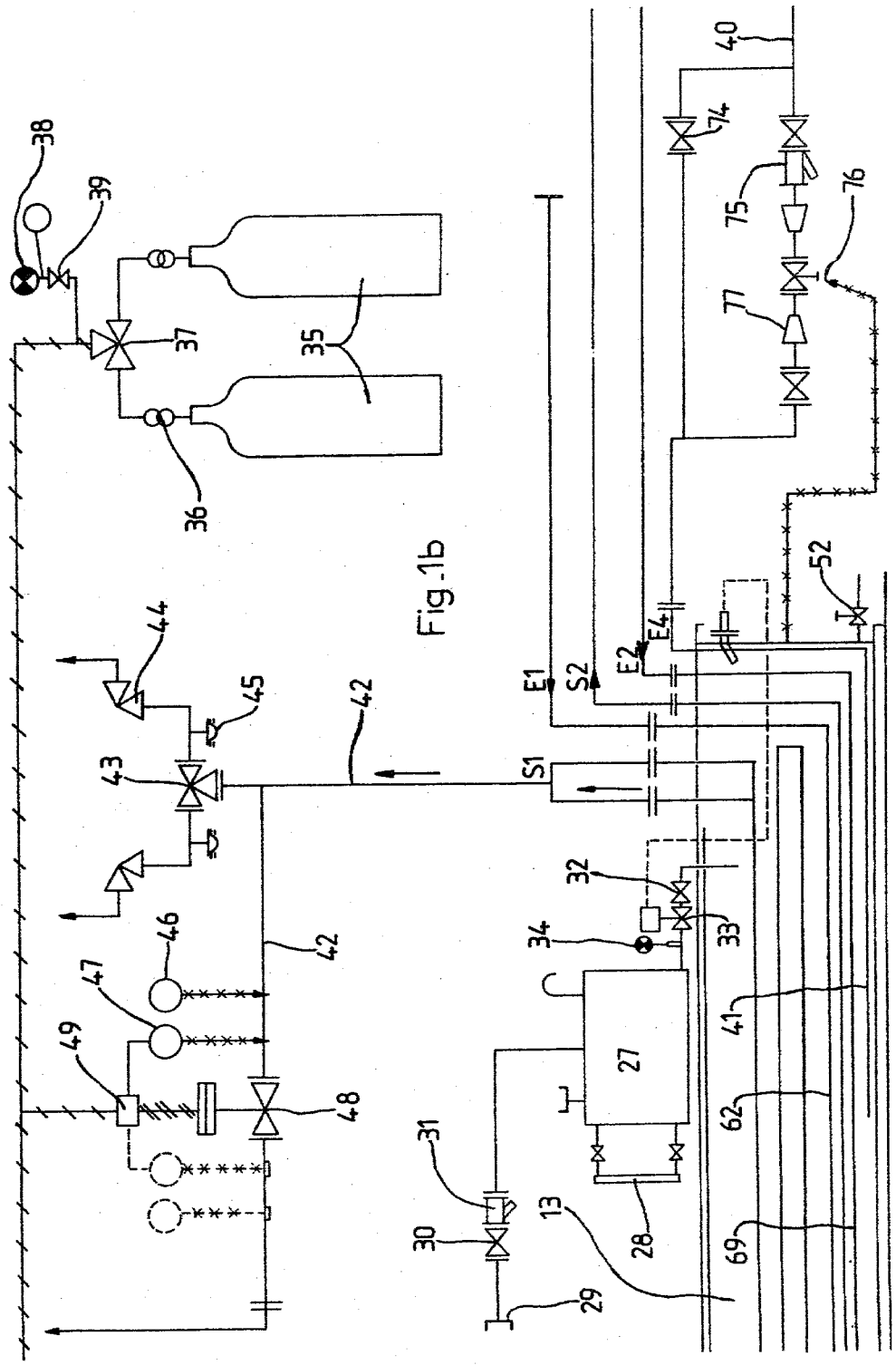

As may be seen from FIG. 1, in the embodiment illustrated, the heat generator is a heater 1 provided with a chimney 2 or with a fume exhaust accelerator, as desired. The heater is fed by a fuel reservoir 3 comprising a fuel level indicator 4 and a controller 5 as well as an alarm 6.

The heater 1 and its burner 7 are themselves also equipped with conventional regulation and control apparatus, specifically a thermometer 8, a manometer 9 and a blow-off valve 10.

Hot water 11 leaving the heater 1 is at a temperature of approximately 90 degrees C. As may be seen from FIG. 1a, this stream feeds into racks 54 for reheating the water of the container 13. These racks 54 are perforated with holes at regular intervals such that the hot water diffuses itself through the water of the container. At the bottom of the container the water is drained by other racks 56 for recycling and flows into a return line 15 for return to the heater by virtue of the action of the two pumps 16, provided with purges 17, sandwiched in this circuit. The circuit comprises screen filters 18, as well as once through valves 14 and unidirectional flap valves 19.

Line 15 for return to the heater is temperature controlled by an automatic regulator 20 controlling a three way mixer valve 21 which directs the water, either towards the heater by way of 15a or back towards the container through 15b, depending upon the temperature measured and as a function of the programmed temperature.

The flow towards the container may be stopped by a one way flap valve 19 while the passage towards the heater occurs by means of a flow controller 22. Each of the two pipes 15a and 15b leaving the mixer valve 21 passes through a reduction 23. At the input to the heater, the line 15a passes through a once through valve 14. An alarm system 24 is arranged at the level of the mixer valve 21.

A conventional safety circuit is shunted across the heater circuit at the level of the heater to compensate for too significant differences in temperature in the water of return circuit 15 and to avoid the "dew point". The shunt circuit 12 takes advantage of the action of an accelerator 26 having an adjustable flow, which thus directs the heating circulation referred to and comprises a one way flap valve 19 between two once through valves 14.

The exchanger 25 immersed in the container 13 is supplemented in FIG. 1b. This figure illustrates both the water feeding the container and of the heating circuit. Also shown is a compressed air reserve which assures the operation of the apparatus, a steam heater circuit, the normal fluid circuit with its distribution means and its rapid pressurization circuit.

The container 13 and the heating racks 54 are thus fed by a reservoir 27 provided with a level indicator 28 and attached at 29 to the consumption network by a line provided with a stop valve 30 and a sieve filter 31.

Water is distributed by a line which comprises another stop valve 32 with electrovalve 33 and alarm system 34.

When the level controller 28 provided on the reservoir 27 senses substantial diminutions with respect to the level desired, it initiates the opening of the stop valve to reestablish the functional equilibrium.

All the regulator elements of the installation are manipulated pneumatically and/or electrically. Pneumatic operation is performed by means of a compressed air circuit schematically shown by two bottles 35 equipped with cutoffs 36, a three way gate valve 37, and with an alarm system 38 having check valve 39.

FIG. 1b also illustrates steam conduit 40 which feeds inlet E4 from which the feed passes into a perforated diffusion ramp 41 for heating the water of container 13. This device can, for example, utilize jets of waste steam or line steam which makes it possible to stop the heater 1 and to save fuel.

Conventional functional and control devices are interposed along steam conduit 40. Specifically, stop valves 74, a sieve filter 75, and a temperature regulator 76 may be arranged between two reducers 77.

In operation, fluid in the liquid state passes at E1 into a principle coil 62 and leaves at S1 as a gas at +15 degrees C. The gas is fed to the utilization station through a line 42 which comprises a safety assembly, particularly at the level of a three way check valve 43 controlled by two blow off valves 44 and two bursting valve heads 45 damaged by pressures greater than the valves 44.

The distribution is carried out by line 42 which is provided with an indicator 46, with a regulator 47 of the temperature and/or the pressure and with a pneumatic check valve 48 in communication with the electric and pneumatic circuit through a control terminal 49.

Fluid in the liquid state is also fed through inlet E2 into a second "rapid pressurization" coil 69 where it is transformed into gaseous fluid to exit through outlet S2 and to return to storage where it accelerates the flow of liquid towards the principle coil 62.

FIGS. 2-5 show the construction of the container, the exchanger and the heating and recycling racks for the water of the container in detail.

As may be seen, the container is a vast rectangular container having a double walled base 50. Its vertical walls 13a as well as the first base wall 13C and cover are covered with thermal insulation 51. A purge valve 52 is provided at the lower portion of one of the sides of the container (FIG. 2).

The heating water coming from the heater through the line 11, enters the container 13 through the inlet E2 and flows into a transverse manifold 53 with at least four pipes 54 extending therefrom. These pipes are closed at their ends opposite from the manifold and are bored along their lower portions at regular intervals and along their entire length with holes 55 in a manner so as to form longitudinal racks occupying substantially the entire length of the container to diffuse the hot water towards the bottom of the container.

The water is recycled by pumping means at the level of the two longitudinal pipes 56 arranged close to the bottom of the container. These pipes are of a larger diameter and are perforated with staggered holes 57. Pipes 56 are closed at one end and connected at the other end to a manifold 58 in communication with the return piping 15 by way of outlet S3.

Figure 3:
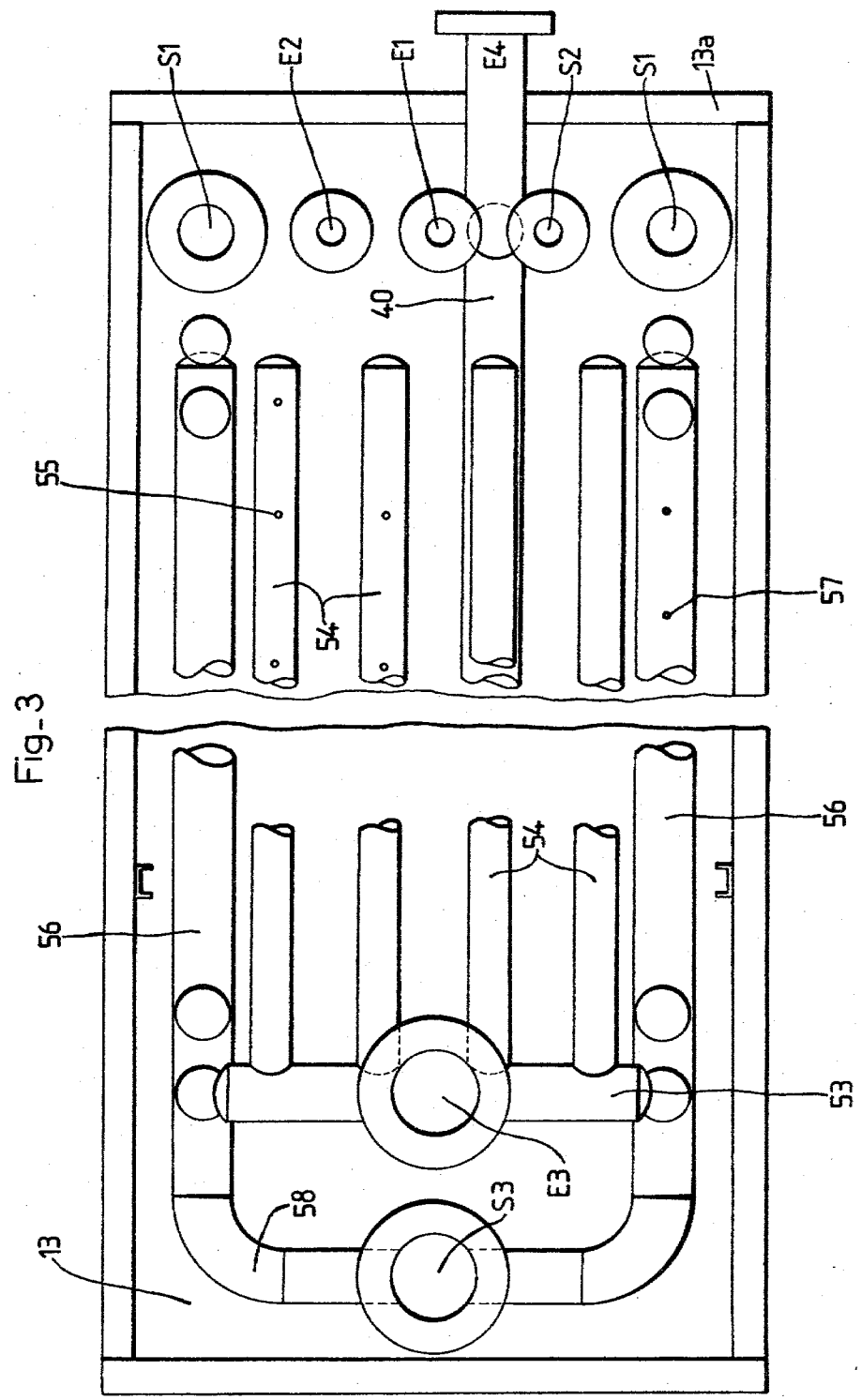
FIG. 3 is a planar view of the container at the upper level.

In FIGS. 3, 4, and 5 it is seen that the steam heating line 40 feeds into inlet E4 and comprises a pipe having a diameter slightly less than that of the water heated pipes. It ends in a manifold 59 arranged at approximately the median portion of the container. The manifold feeds two longitudinal parallel racks 60 perforated with holes 61 in a staggered fashion, for diffusion of the steam. This steam circuit is arranged at the same level as the heating water recovery circuit.

The exchanger 25 in which the transformation of the liquid fluid into the gaseous fluid occurs, is longitudinally arranged so as to occupy the free space of the container between the inputs and outputs of the heating circuits and across practically its entire width. The exchanger comprises two coils. One coil 62 called the principle coil comprises a feed E1 which feeds a first transverse manifold 63 which feeds two tube bundles. Each of the bundles is in the form of a layer 64 arranged in parallel with the other layer such that the fluid travels from one end of the container to the other and back again twice as it travels from the bottom to the top of the container through successive manifolds 65, 66, and 67 and a last manifold 68 which ends in outlet S1 through which fluid in the gaseous state flows to the distribution network.

The second coil called the "rapid pressurization coil" comprises an inlet E2 arranged at approximately a quarter of the width of the base supplying a pipe 69 which descends beneath the lower bundle of the principle coil and is bent ninety degrees to extend at this level in the form of an elongated U whose return branch is bent ninety degrees and extends towards the outlet S2 arranged symetrically to the inlet, E1 (E2 in original text), both E2 and S2 being spaced by the same amount from the opposite sides of the container. The fluid in the gaseous state which leaves through S2 feeds the activation circuit for actuating fluid flow through the principle coil 62.

FIG. 6 shows a front elevational view of one of the four frames supporting the principle coil. These frames comprise a metallic frame 71 enclosing boards 72 provided with aligned openings to accomodate the pipe bundles. These aligned frames are adapted to minimize the vibrations likely to be produced in the bundle during operation. A central flat iron 73 vertically connects the upper and lower edges of the frame and cooperates with a device (not shown) bolted to the upper portion of the said frames so as to pemit the coil to be hoisted.

I claim:

1. A self-contained apparatus for heating a cryogenic fluid, said apparatus comprising:
    (a) a container adapted to receive heating water for heating said cryogenic fluid;
    (b) first heating means within said container for heating said heating water;
    (c) second heating means for heating said heating water outside of said container; and
    (d) recycle means for recycling said heating water from said container and either into said second heating means or back into said container, said recycle means comprising at least one perforated rack adapted to drain said heating water from said container, and means for directing said heating water from said at least one perforated rack either into said second heating means or back into said container.

2. The apparatus as defined by claim 1, wherein said container comprises at least one heating line adapted to receive said cryogenic fluid, and wherein said heating line is adapted to be heated by said heating water through direct contact with said heating water.

3. The apparatus as defined by claim 2 wherein said first heating means are connected to a source of heated water, gas or steam.

4. The apparatus as defined by claim 3 in combination with a vehicle for transporting said apparatus.

5. The apparatus combination as defined by claim 10 wherein said recycle means further comprises pump means adapted to return said heating water to said second heating means.

6. The apparatus as defined by claim 1 wherein said first heating means comprises a manifold connected to at least four pipes, each of said pipes being perforated at regular intervals along the lower portions of each of said pipes and extending substantially the entire length of said container whereby said heating fluid fed into each of said pipes is free to flow out of said pipes and then pass downwardly to the base of said container thereby heating said cryogenic fluid.

7. The apparatus as defined by claim 6 wherein said container comprises heating lines adapted to receive said cryogenic fluid and arranged such that said heating water contacts said heating lines as it descends through said container.

8. The apparatus as defined by claim 7 whereby each of said pipes is closed at its end opposite to said manifold.

9. The apparatus as defined by claim 8 wherein said rack of said recycle means comprises two longitudinal pipes arranged at the base of said container, each of said longitudinal pipes being closed at one end thereof and comprising a staggered array of holes adapted to drain said heating water from said recycle means further comprising container; said pumping means adapted to pump said heating water from said container through said longitudinal pipes to said second heating means.

10. The apparatus as defined by claim 9 whereby each of said longitudinal pipes is connected to a manifold adapted to receive said heating water from each of said longitudinal pipes prior to entering said pumping means.

11. The apparatus as defined by claim 10 further comprising at least one frame adapted to support each of said pipes and lines thereby rendering said pipes, said longitudinal pipes and said lines resistant to vibration.

12. The apparatus as defined by claim 11 wherein said first heating means further comprises perforated steam feed lines arranged at the base of said container adapted to inject steam at the base of said container for heating water within said container.

13. The apparatus as defined by claim 12 wherein said frame comprises a plurality of boards comprising a plurality of aligned orifices adapted to receive and support each of said pipes, said longitudinal pipes and said lines.

14. The apparatus as defined by claim 13 wherein said recycle means further comprises a three-way valve adapted to direct at least some of said heating fluid to said heating means or to return at least some of said heating fluid to said container.

15. The apparatus as defined by claim 14 wherein said recycle means comprises an automatic regulator adapted to control said three-way valve as a function of the actual and pre-selected temperatures of said water.

16. The apparatus as defined by claim 1 wherein said container comprises a double bottom wall, sidewalls and a cover and thermal insulation is provided along each of said walls.

17. The apparatus as defined by claim 16 further comprising a rapid pressurization means, said rapid pressurization means comprising means for heating a liquid in said container to convert said liquid into a gas and means for utilising said gas to force said cryogenic fluid into said heating lines.

18. The apparatus as defined by claim 1 wherein said second heating means comprises a heater and a burner.

* * * * *

UNITED STATES PATENT AND TRADEMARK OFFICE
CERTIFICATE OF CORRECTION

PATENT NO. : 4,242,986
DATED : January 6, 1981
INVENTOR(S) : Ermano BO

It is certified that error appears in the above—identified patent and that said Letters Patent is hereby corrected as shown below:

Column 2, line 62, "dimunutions" should be --diminutions--.
Column 3, line 41, the "," should be deleted; and
        line 67, the "," should be deleted.
Column 4, line 4, "principle" should be --principal--;
        line 17, "principle" should be --principal--;
        line 21, "symetrically" should be --symmetrically--;
        line 21, ", E1 (E2 in original text)" should be --E1--;
        line 22, "E2" should be --E1--;
        lines 25-26, "principle" should be --principal--; and
        line 28, "principle" should be --principal--.
Claim 5, line 65, "10" should be --4--.
Claim 9, line 25, before "container", --said-- should be inserted.
Claim 17, line 30, "utilising" should be --utilizing--.

*Signed and Sealed this*

*Second* Day of *June 1981*

[SEAL]

Attest:

RENE D. TEGTMEYER

*Attesting Officer*     *Acting Commissioner of Patents and Trademarks*